United States Patent
Hamzy

(10) Patent No.: US 8,120,810 B2
(45) Date of Patent: Feb. 21, 2012

(54) METHOD AND SYSTEM FOR ADJUSTING SCANNED IMAGES

(75) Inventor: Mark Joseph Hamzy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1229 days.

(21) Appl. No.: 11/837,051

(22) Filed: Aug. 10, 2007

(65) Prior Publication Data

US 2009/0040569 A1  Feb. 12, 2009

(51) Int. Cl.
*G06F 15/00* (2006.01)
*G06K 1/00* (2006.01)
*G06F 3/12* (2006.01)
*G06K 15/00* (2006.01)

(52) U.S. Cl. .......... 358/1.2; 358/1.15; 358/450

(58) Field of Classification Search ........ 358/1.11–1.18, 358/498, 296; 382/112, 209, 288
See application file for complete search history.

(56) References Cited

U.S. PATENT DOCUMENTS

| | | | |
|---|---|---|---|
| 5,191,429 A * | 3/1993 | Rourke | 358/296 |
| 5,892,854 A * | 4/1999 | de Queiroz et al. | 382/288 |
| 6,266,512 B1 | 7/2001 | de Koning et al. | |
| 6,373,590 B1 | 4/2002 | Ancin et al. | |
| 6,456,732 B1 * | 9/2002 | Kimbell et al. | 382/112 |
| 6,738,154 B1 * | 5/2004 | Venable | 358/1.15 |
| 6,791,723 B1 * | 9/2004 | Vallmajo et al. | 358/488 |
| 6,898,317 B2 * | 5/2005 | Struble et al. | 382/209 |
| 2002/0122067 A1 * | 9/2002 | Geigel et al. | 345/788 |
| 2004/0174563 A1 * | 9/2004 | Cassidy et al. | 358/1.18 |
| 2005/0068583 A1 | 3/2005 | Gutkowski et al. | |

FOREIGN PATENT DOCUMENTS

EP  1150176 A1  10/2001

* cited by examiner

*Primary Examiner* — Mark K Zimmerman
*Assistant Examiner* — Satwant Singh
(74) *Attorney, Agent, or Firm* — Yee & Associates, P.C.; Steven L. Bennett

(57) ABSTRACT

A system for adjusting scanned images for printing. In response to scanning one or more objects, one or more bounding boxes are calculated for the scanned image. The scanned image is cropped to a size of the one or more bounding boxes. The cropped image is rotated to align with a scanner bed and other cropped images if necessary. The cropped image is centered. It is determined if more scanned image data can fit within a selected page size. In response to determining that more scanned image data can fit within the selected page size, it is determined if more objects need to be scanned in a print job. In response to determining that more objects do not need to be scanned in the print job, a print layout is determined for the print job. Then, the print job is printed on the selected page size.

16 Claims, 4 Drawing Sheets

METHOD AND SYSTEM FOR ADJUSTING SCANNED IMAGES

BACKGROUND OF THE INVENTION

1. Field of the Invention

The present invention relates generally to an improved copier system. More specifically, the present invention is directed to a computer implemented method, system, and computer useable program code for automatically adjusting one or more scanned images for printing.

2. Description of the Related Art

Today, a copier is essentially a specialized computer. Copiers use a scanner as a front end, a disk subsystem as a temporary storage, and a printer as a back end. Copying is an example of a class of image-processing applications in which proper alignment of an image is desirable. In most cases, alignment of a standard sized page on a copier's scanner bed is easy. A user places the standard size page to abut an edge of the copier's scanner bed so as to align edges of the page with ruled indicia provided for that purpose.

However, alignment becomes more difficult when the user wants to create a composite image of a number of small papers. For example, a user may place a number of photographs on the scanning bed in order to make a single composite copy. Other common examples may include recipes, returned checks, and business cards. Also, it is not uncommon for the user to cut out pieces of text from a newspaper or other source and copy the pieces onto a single page.

In these types of situations the user typically cannot, or may not want to, abut all of the pieces or papers against the scanner bed's edge. In addition, the scanner bed indicia are not designed to align multiple smaller, irregular sized pieces of paper. As a result, the user must align the pieces by visual impression. Consequently, the results are usually not very satisfactory.

Even with painstaking positioning of these objects on the scanner bed, closing the copier's lid often disturbs positioning of the objects. One solution to this problem is to affix individual objects to a sheet of paper using tape or glue and then place the single sheet of paper on the scanner bed. However, this procedure is tedious and time consuming. Also, the tape or glue used to affix the objects to the paper may mar the original objects or mar the glass on the scanner bed causing future copies to be corrupted.

Therefore, it would be beneficial to have an improved computer implemented method, system, and computer usable program code for automatically resizing, rotating, centering, and fitting one or more scanned images for printing onto a single sheet of paper.

SUMMARY OF THE INVENTION

Illustrative embodiments provide a computer implemented method and computer usable program code in a copier system for adjusting scanned images for printing. In response to scanning one or more objects, one or more bounding boxes are calculated for the scanned image. The scanned image is cropped to a size of the one or more bounding boxes. The cropped image is rotated to align with a scanner bed and other cropped images if necessary. In addition, the cropped image is centered. Also, it is determined if more scanned image data can fit within a selected page size. In response to determining that more scanned image data can fit within the selected page size, it is determined if more objects need to be scanned in a print job. In response to determining that more objects do not need to be scanned in the print job, a print layout is determined for the print job. Then, the print job is printed on the selected page size.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
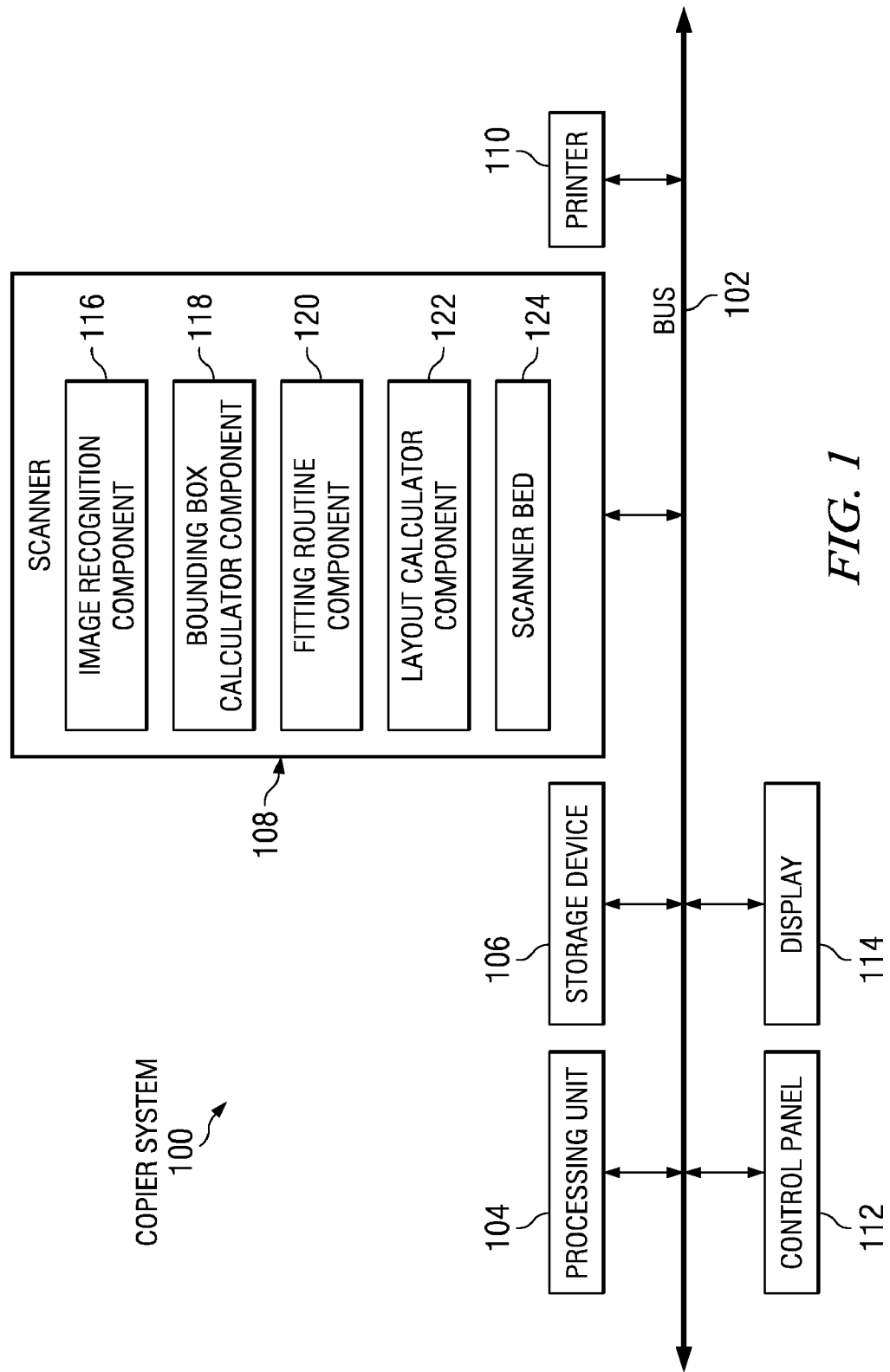
FIG. 1 is a block diagram of a copier system in which illustrative embodiments may be implemented.

With reference now to the figures and in particular with reference to FIG. 1, an exemplary diagram of a copier environment is provided in which illustrative embodiments may be implemented. It should be appreciated that FIG. 1 is only exemplary and is not intended to assert or imply any limitation with regard to environments in which different embodiments may be implemented. Many modifications to the depicted environment may be made.

FIG. 1 depicts a block diagram of a copier system in which illustrative embodiments may be implemented. Copier system 100 includes processing unit 104, storage device 106, scanner 108, printer 110, control panel 112, and display 114, which are coupled to bus 102. Bus 102 may comprise one or more buses, such as, for example, a system bus, an I/O bus, and a PCI bus. Of course, bus 102 may be implemented using any type of communications fabric or architecture that provides for a transfer of data between different components or devices attached to the fabric or architecture.

Processing unit 104 provides the data processing capabilities of copier system 100. An operating system, or some other type of control program, runs on processing unit 104 and coordinates and provides control of various components within copier system 100. In addition, software applications executing on copier system 100 may run in conjunction with the operating system or control program.

Storage device 106 may represent a plurality of storage devices, such as, for example, read only memory (ROM) and random access memory (RAM). Storage device 106 provides the non-volatile memory for storing the operating system, applications, user-generated data, and/or copier-generated data. Storage device 106 also stores instructions or computer usable program code for the operating system, applications, and illustrative embodiments. The instructions are loaded into a memory for execution by processing unit 104. Processing unit 104 performs processes of illustrative embodiments by executing the computer usable program code that is loaded into the memory.

Copier system 100 uses scanner 108 to scan objects placed on scanner bed 124. Scanner 108 creates image data on the source object(s) and outputs digital image data for the source object(s). Scanner bed 124 is a flat, transparent surface where a user of copier system 100 places an object for copying.

Scanner 108 includes image recognition component 116, bounding box calculator component 118, fitting routine component 120, and layout calculator component 122. However, it should be noted that even though these components are shown within scanner 108, illustrative embodiments are not limited to such. One or more of these components may function independently of scanner 108. Scanner 108 uses image recognition component 116 to generate the digital image data for the object placed on scanner bed 124. Copier system 100 uses storage device 106 to store the scanned digital image data.

Bounding box calculator component 118 calculates a bounding box for each printable image within the scanned digital image. A bounding box is the smallest rectangular area that contains printable data. Fitting routine component 120 automatically adjusts each scanned image by, for example, cropping, rotating, and/or centering each of the bounding boxes calculated for the printable images in an appropriate orientation to fit within a selected page size. Layout calculator component 122 determines the layout for an entire print job. The entire print job may consist of one page or a plurality of pages.

Copier system 100 uses printer 110 to print the print job on the selected page size. The selected page size may, for example, be a default paper size or user-selected paper size. Optionally, copier system 100 may automatically select an appropriate paper size depending upon the size of the print job. The paper may be standard copier paper or some other type of recording sheet, such as photographic paper.

Copier system 100 utilizes control panel 112 to receive user input for selecting functions and features of copier system 100. Display 114 may be a known display device, such as a liquid crystal display (LCD) or an organic light-emitting diode (OLED), for displaying various textual and/or graphical information, such as operating conditions or user options, to the user.

Further, it should be noted that a user of copier system 100 may enable and disable processes of illustrative embodiments, such as bounding box calculation, fitting routine, and layout calculation, independently of other copier system 100 functions and features. Furthermore, a user may adjust default settings for the bounding box calculation, fitting routine, and layout calculation as the user desires using control panel 112. Moreover, it should be noted that processes of illustrative embodiments may be implemented entirely as software, hardware, or as a combination of software and hardware components.

Those of ordinary skill in the art will appreciate that the components depicted in FIG. 1 may vary depending on implementation of illustrative embodiments. Other internal components or peripheral devices may be used in addition to, or in place of, the components shown in FIG. 1. For example, copier system 100 also may include a voice recognition system in order to perform features and functions activated by user voice command.

Illustrative embodiments provide a computer implemented method and computer usable program code in a copier system for adjusting scanned images for printing on a single sheet of paper. In response to a scanner scanning one or more objects on a scanner bed, a bounding box calculator calculates one or more bounding boxes for the scanned image of the one or more objects. The one or more objects may, for example, be one or more sheets of paper containing text and/or graphics or smaller pieces of paper, such as checks, or photographs. Then, a fitting routine crops the scanned image to the size of each bounding box and rotates the cropped image to align with a scanner bed and other cropped images if necessary.

In addition, the fitting routine centers the cropped image with regard to a selected page size and the other cropped images. Further, the fitting routine determines if more scanned image data can fit within the selected page size. In response to the fitting routine determining that more scanned image data can fit within the selected page size, the copier system determines if more objects need to be scanned in the print job. In response to the copier system determining that more objects do need to be scanned in the print job, the scanner scans another object on the scanner bed. Then, the process repeats to adjust the scanned image to fit with the previously scanned images within the selected page size as described above.

In response to the copier system determining that more objects do not need to be scanned in the print job, a print layout calculator determines a print layout for the print job. Then, the copier system sends the print layout for the print job to a printer. Finally, the printer prints the print job on the selected page size.

Thus, illustrative embodiments process the digital scanned image and calculate one or more bounding boxes for printable images within the digital scanned image. The bounding box is the smallest rectangle that contains printable data. As a result, a digital image may contain more than one bounding box because the digital image may contain blank areas that are not a part of the printable image. Also, it should be noted that the bounding box calculator may calculate bounding boxes for each page or for an entire print job, which may consist of a plurality of pages, prior to printing. By calculating a bounding box for printable images, illustrative embodiments may perform several features.

First, illustrative embodiments may center multiple pages so that, when duplexed, the fitting routine may trim or crop pages from all four edges by removing any unnecessary blank areas. Second, illustrative embodiments may print multiple pages onto a fewer number of pages. For example, if page ordering is not important in a print job and page two and page five contain large areas that do not contain any text or graphics, then page two and page five may be printed on the same page, space permitting on the selected paper size. However, illustrative embodiments, as an optional feature, may automatically select an appropriate page size for the print job as a paper conservation measure. For example, if the copier system includes multiple paper sources of differing sizes, then the copier system may automatically select the smallest paper size to accommodate the print job without user intervention.

In addition, illustrative embodiments may use the fitting routine to fit four 3×5 index cards onto one 8½×11 sheet of copier paper even though the four 3×5 cards were not scanned on the scanner bed at the same time. Further, if the scanned object was not aligned against the edge of the scanner bed, then the fitting routine may also automatically align the scanned image in an appropriate orientation for printing. For example, a user may hurriedly slap a small piece of paper at a 45 degree angle in the middle of the scanner bed and press "copy" on the control panel. The fitting routine may rotate and align the scanned image so that the scanned image is flush against the top and left sides of the selected paper size when printed. Furthermore, the layout calculator component may determine an optimum print layout for each page or for an entire print job prior to printing.

Figure 2:
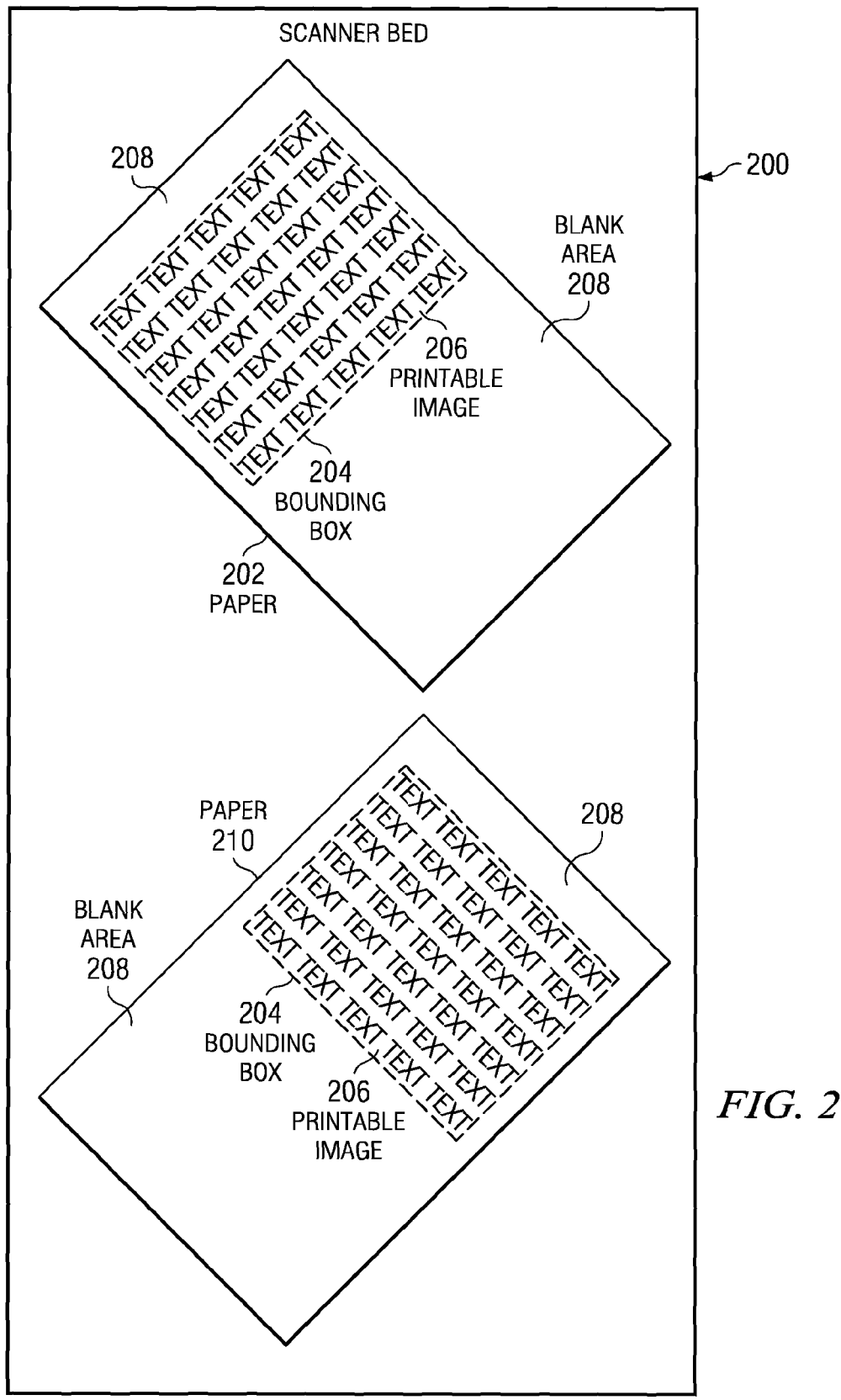
FIG. 2 is an exemplary illustration of printable images on a scanner bed in accordance with an illustrative embodiment.

With reference now to FIG. 2, an exemplary illustration of printable images on a scanner bed is depicted in accordance with an illustrative embodiment. Scanner bed 200 may, for example, be scanner bed 124 in FIG. 1. In addition, scanner bed 200 may be implemented in a copier system, such as copier system 100 in FIG. 1.

In this exemplary illustration, a user placed paper 202 and paper 210 on scanner bed 200 for copying by the copier system. Also, it is evident from this exemplary illustration that the edges of papers 202 and 210 are not aligned with the edges of scanner bed 200. Further, the edges of papers 202 and 210 are not aligned with each other. However, as noted above, illustrative embodiments are capable of automatically adjusting, which may include rotating, aligning, centering, and fitting, one or more scanned images for printing in an appropriate orientation on a selected page size.

Paper 202 and paper 210 both include a printable image, such as printable image 206, as well as blank areas, such as blank area 208, that do not contain any text, graphics, or other images. After the copier system uses a scanner, such as scanner 108 in FIG. 1, to scan papers 202 and 210, the copier system uses a bounding box calculator, such as bounding box calculator component 118 in FIG. 1, to calculate a bounding box, such as bounding box 204, around printable image 206 in both paper 202 and paper 210. As a result, bounding box 204 defines the edges of printable image 206.

Then, the copier system uses a fitting routine, such as fitting routing component 120 in FIG. 1, to crop paper 202 and paper 210 to the size of bounding box 204 by eliminating blank area 208 from both paper 202 and paper 210. Subsequently, the fitting routine rotates the cropped images to align with the edges of scanner bed 200 in an appropriate orientation for printing. Further, the fitting routine centers the cropped images within the selected page size. Centering may involve positioning one printable image immediately above the other or positioning the two printable images side-by-side, space permitting within the selected page size. If a printing option exists in such a situation as to which configuration the user prefers, the copier system may present this printing option to the user via a display panel, such as display 114 in FIG. 1.

Furthermore, the copier system may make a decision as to whether more scanned image data may be included within the selected page size. If more image data may be contained within the selected page size, the copier system may ask the user if the user wishes to copy other items onto the selected page size. If the user chooses to copy more data onto the selected page size the process starts over again. If the user does not want to include anymore data on the selected page size, the copier system uses a layout calculator, such as layout calculator component 122 in FIG. 1, to determine the print layout for the print job. However, it should be noted that a print job may include more than one page. In other words, illustrative embodiments may not send one page of a print job for printing until all pages of the print job are adjusted as described above. Alternatively, illustrative embodiments may individually send each page of the print job for printing after each page is adjusted for printing.

Figure 3:
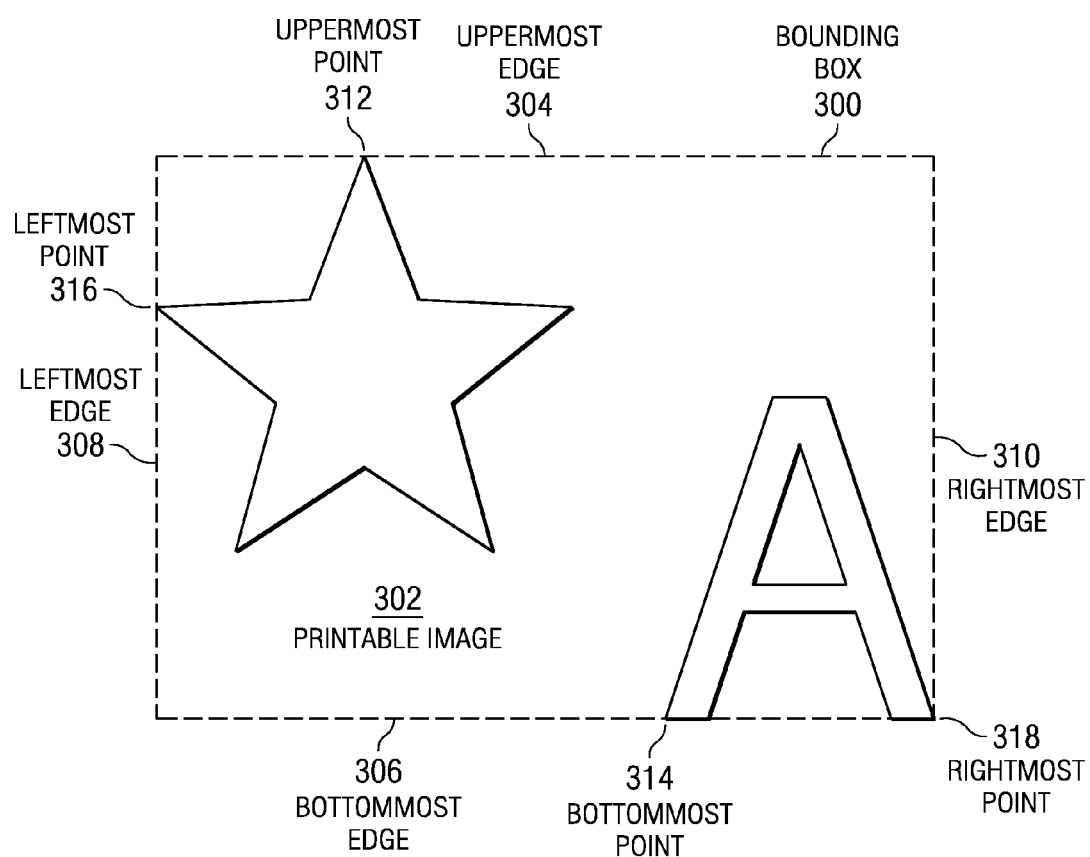
FIG. 3 is an exemplary illustration of a bounding box in accordance with an illustrative embodiment.

With reference now to FIG. 3, an exemplary illustration of a bounding box is depicted in accordance with an illustrative embodiment. Bounding box 300 may, for example, be bounding box 204 in FIG. 2. Bounding box 300 includes uppermost edge 304, bottommost edge 306, leftmost edge 308, and rightmost edge 310, which bound printable image 302. Printable image 302 is an image that is capable of being scanned and printed by a copier system, such as copier system 100 in FIG. 1. Uppermost edge 304 forms the uppermost boundary for printable image 302, bottommost edge 306 forms the bottommost boundary for printable image 302, leftmost edge 308 forms the leftmost boundary for printable image 302, and rightmost edge 310 forms the rightmost boundary for printable image 302.

A bounding box calculator, such as bounding box calculator component 118 in FIG. 1, calculates uppermost edge 304 by determining the uppermost point, such as uppermost point 312, of the text, graphic, and/or image contained within printable image 302. Likewise, the bounding box calculator calculates bottommost edge 306 by determining bottommost point 314, leftmost edge 308 by determining leftmost point 316, and rightmost edge 310 by determining rightmost point 318. As a result, the bounding box calculator is able to determine bounding box 300 for printable image 302.

Figure 4:
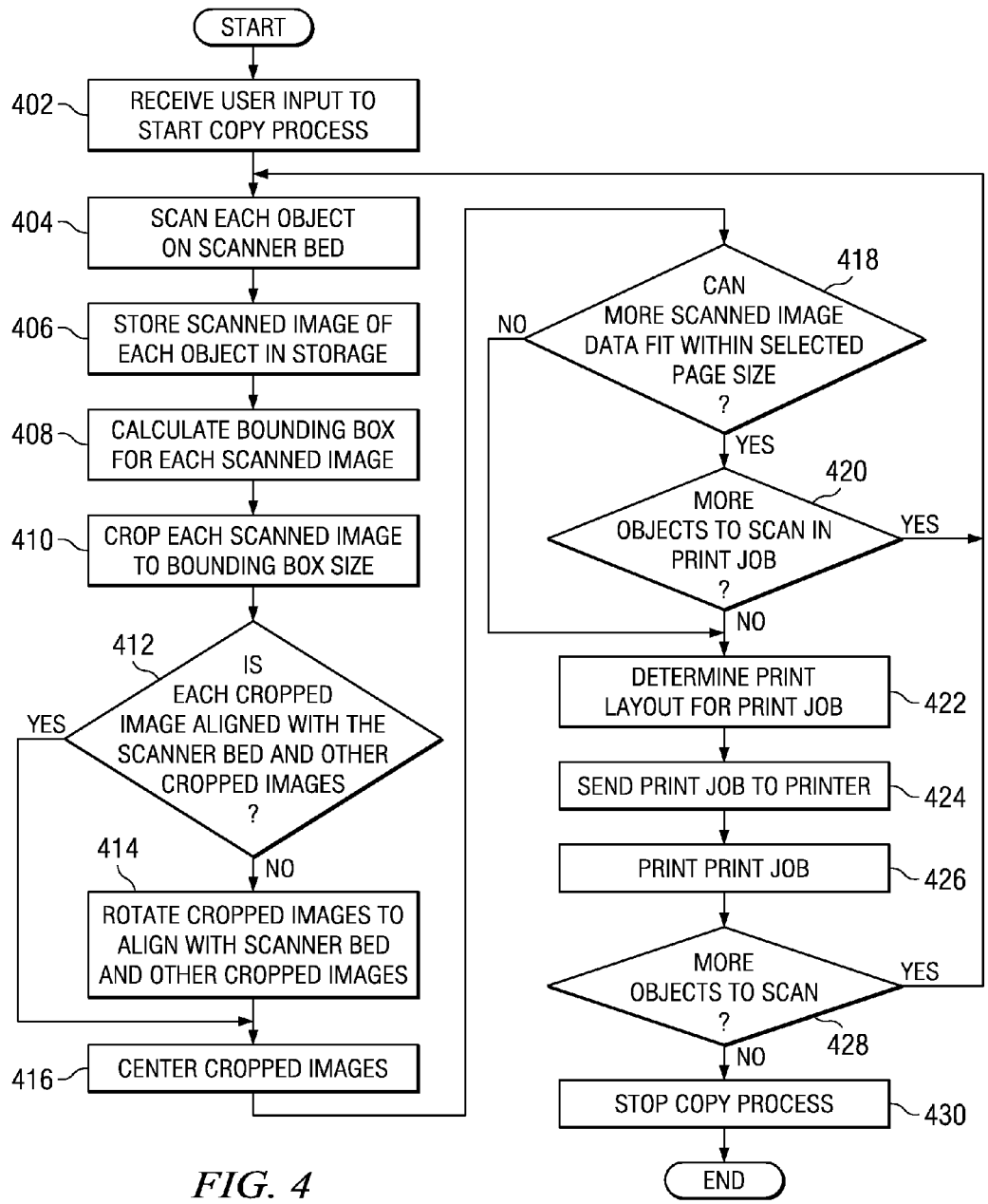
FIG. 4 is a flowchart illustrating an exemplary process for automatically adjusting one or more scanned images for printing in accordance with an illustrative embodiment.

With reference now to FIG. 4, a flowchart illustrating an exemplary process for automatically adjusting one or more scanned images for printing is shown in accordance with an illustrative embodiment. The process shown in FIG. 4 may be implemented in a copier, such as, for example, copier system 100 in FIG. 1.

The process begins when the copier receives a user input in a control panel, such as control panel 112 in FIG. 1, to start a copy process (step 402). Then, the copier uses a scanner, such as scanner 108 in FIG. 1, to scan each object on a scanner bed, such as scanner bed 124 in FIG. 1 (step 404). The object may, for example, be a standard sized sheet of paper containing text and/or graphics, an irregular sized and shaped piece of paper containing text and/or graphics, a photograph containing photographic images, or any other item capable of being placed on the scanner bed and scanned.

After scanning each object in step 404, the copier stores a scanned image of each object in storage, such as storage device 106 in FIG. 1 (step 406). Then, the copier uses a bounding box calculator, such as bounding box calculator component 118 in FIG. 1, to calculate a bounding box for each scanned image (step 408). However, it should be noted that each scanned image may include one or more bounding boxes.

Subsequent to the bounding box calculator calculating one or more bounding boxes for each scanned image in step 408, the copier uses a fitting routine, such as fitting routine component 120 in FIG. 1, to crop each scanned image to a bounding box size (step 410). Then, the fitting routine makes a determination as to whether each cropped image is aligned with the scanner bed and other cropped images, if necessary (step 412). If each cropped image does align with the scanner bed and other cropped images, yes output of step 412, then the process proceeds to step 416. If each cropped image does not align with the scanner bed and other cropped images, no output of step 412, then the fitting routine rotates the cropped images to align with the scanner bed and the other cropped images, if necessary (step 414).

After rotating the cropped images to align with the scanner bed and the other cropped images in step 414, the fitting routine centers the cropped images (step 416). Then, the fitting routine makes a determination as to whether more scanned image data can fit within the selected page size. The selected page size may be a default page size, a user-selected page size, or an automatically selected page size based on the cropped images.

If more scanned image data cannot fit within the selected page size, no output of step 418, then the process proceeds to step 422. If more scanned image data can fit within the selected page size, yes output of step 418, then the copier makes a determination as to whether more objects need to be scanned in the print job (step 420). It should be noted that an entire print job may comprise only one object or a plurality of objects. If more objects need to be scanned, yes output of step 420, then the process returns to step 404. However, it should be noted that the copier may automatically load, or the user may manually place, one or more new objects on the scanner bed prior to the copier performing step 404. If more objects do not need to be scanned, no output of step 420, then the copier uses a layout calculator, such as layout calculator component 122 in FIG. 1, to determine a print layout for the print job (step 422).

Subsequent to determining the layout for the print job in step 422, the layout calculator sends the print job to a printer, such as printer 110 in FIG. 1, for printing (step 424). Then, the printer prints the print job (step 426). Afterward, the copier makes a determination as to whether more objects need to be scanned (step 428). If more objects do need to be scanned, yes output of step 428, then the process returns to step 404. If more objects do not need to be scanned, no output of step 428, then the copier stops the copy process (step 430). The process terminates thereafter.

Thus, illustrative embodiments provide a computer implemented method, system, and computer usable program code for automatically resizing, rotating, centering, and fitting one or more scanned images for printing onto a single sheet of paper. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a copier system for adjusting scanned images for printing, the computer implemented method comprising:
   responsive to scanning a page within a plurality of pages in a print job to form a scanned image of the page, calculating, by the copier system, one or more bounding boxes for the scanned image of the page;
   cropping, by the copier system, the scanned image of the page to a size of the one or more bounding boxes removing blank areas that do not contain scannable images to form a cropped image of the page;
   rotating, by the copier system, the cropped image of the page to align with a scanner bed of the copier system;
   centering, by the copier system, the cropped image of the page;
   determining, by the copier system, if scanned image data from another page within the plurality of pages in the print job can fit with the cropped image of the page on a selected page size;
   responsive to determining that scanned image data from another page within the plurality of pages in the print job can fit with the cropped image of the page on the selected page size, determining, by the copier system, if more pages within the plurality of pages need to be scanned in the print job;
   responsive to determining that more pages within the plurality of pages need to be scanned in the print job, scanning, by the copier system, another page within the plurality of pages in the print job;
   responsive to determining that no more pages need to be scanned within the plurality of pages in the print job, determining, by the copier system, a print layout for all pages within the plurality of pages in the print job by reordering cropped images of pages in the print job that fit on a same page of the selected page size prior to printing; and
   printing, by the copier system, the print job on the selected page size by printing reordered cropped images of pages in the print layout that fit on the same page of the selected page size on the same page.

2. The computer implemented method of claim 1, wherein the calculating step is performed by a bounding box calculator, and wherein the bounding box calculator calculates an uppermost edge, a bottommost edge, a leftmost edge, and a rightmost edge around a printable image within the scanned image of the page to form a bounding box.

3. The computer implemented method of claim 1, wherein the print job includes a plurality of individually scanned pages within the selected page size.

4. The computer implemented method of claim 3, wherein the plurality of individually scanned pages are appropriately adjusted in a proper orientation within the selected page size for printing.

5. The computer implemented method of claim 1, wherein a voice recognition system performs functions activated by user voice command within the copier system.

6. The computer implemented method of claim 1, wherein printing the print job on the selected page size uses a number of printed pages that is less than a number of the plurality of pages in the print job by printing the reordered cropped images of pages in the print layout that fit on the same page of the selected page size on the same page.

7. A copier system for adjusting scanned images for printing, comprising:
    a bus system;
    a scanner connected to the bus system;
    a printer connected to the bus system;
    a storage device connected to the bus system, wherein the storage device stores a set of instructions; and
    a processing unit connected to the bus system, wherein the processing unit executes the set of instructions to calculate one or more bounding boxes for a scanned image of a page in response to scanning the page within a plurality of pages in a print job to form the scanned image of the page; crop the scanned image of the page to a size of the one or more bounding boxes removing blank areas that do not contain scannable images to form a cropped image of the page; rotate the cropped image of the page to align with a scanner bed of the copier system; center the cropped image of the page; determine if scanned image data from another page within the plurality of pages in the print job can fit with the cropped image of the page on a selected page size; determine if more pages within the plurality of pages need to be scanned in the print job in response to determining that scanned image data from another page within the plurality of pages in the print job can fit with the cropped image of the page on the selected page size; scan another page within the plurality of pages in the print job in response to determining that more pages within the plurality of pages need to be scanned in the print job; determine a print layout for all pages within the plurality of pages in the print job by reordering cropped images of pages in the print job that fit on a same page of the selected page size prior to printing in response to determining that no more pages need to be scanned within the plurality of pages in the print job; and print the print job on the selected page size by printing reordered cropped images of pages in the print layout that fit on the same page of the selected page size on the same page.

8. The copier system of claim 6, wherein the instructions to calculate are performed by a bounding box calculator, and wherein the bounding box calculator calculates an uppermost edge, a bottommost edge, a leftmost edge, and a rightmost edge around a printable image within the scanned image of the page to form a bounding box.

9. The copier system of claim 6, wherein the print job includes a plurality of individually scanned pages within the selected page size.

10. The copier system of claim 9, wherein the plurality of individually scanned pages are appropriately adjusted in a proper orientation within the selected page size for printing.

11. The copier system of claim 6, wherein a voice recognition system performs functions activated by user voice command within the copier system.

12. A computer program product stored on a computer readable storage device having computer usable program code embodied thereon that is executable by a copier system for adjusting scanned images for printing, the computer program product comprising:
    computer usable program code for calculating one or more bounding boxes for a scanned image of a page in response to scanning the page within a plurality of pages in a print job to form the scanned image of the page;
    computer usable program code for cropping the scanned image of the page to a size of the one or more bounding boxes removing blank areas that do not contain scannable images to form a cropped image of the page;
    computer usable program code for rotating the cropped image of the page to align with a scanner bed of the copier system;
    computer usable program code for centering the cropped image of the page;
    computer usable program code for determining if scanned image data from another page within the plurality of pages in the print job can fit with the cropped image of the page on a selected page size;
    computer usable program code for determining determine if more pages within the plurality of pages need to be scanned in the print job in response to determining that scanned image data from another page within the plurality of pages in the print job can fit with the cropped image of the page on the selected page size;
    computer usable program code for scanning another page within the plurality of pages in the print job in response to determining that more pages within the plurality of pages need to be scanned in the print job;
    computer usable program code for determining a print layout for all pages within the plurality of pages in the print job by reordering cropped images of pages in the print job that fit on a same page of the selected page size prior to printing in response to determining that no more pages need to be scanned within the plurality of pages in the print job; and
    computer usable program code for printing the print job on the selected page size by printing reordered cropped images of pages in the print layout that fit on the same page of the selected page size on the same page.

13. The computer program product of claim 12, wherein the computer usable program code for calculating is performed by a bounding box calculator, and wherein the bounding box calculator calculates an uppermost edge, a bottommost edge, a leftmost edge, and a rightmost edge around a printable image within the scanned image of the page to form a bounding box.

14. The computer program product of claim 12, wherein the print job includes a plurality of individually scanned pages within the selected page size.

15. The computer program product of claim 14, wherein the plurality of individually scanned pages are appropriately adjusted in a proper orientation within the selected page size for printing.

16. The computer program product of claim 14, wherein a voice recognition system performs functions activated by user voice command within the copier system.

* * * * *